United States Patent
Bruinsma

(10) Patent No.: US 11,208,570 B2
(45) Date of Patent: Dec. 28, 2021

(54) WHITE INKS

(71) Applicant: Hewlett-Packard Development Company, L.P., Spring, TX (US)

(72) Inventor: Paul Joseph Bruinsma, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 414 days.

(21) Appl. No.: 16/463,271

(22) PCT Filed: Apr. 13, 2017

(86) PCT No.: PCT/US2017/027428
§ 371 (c)(1),
(2) Date: May 22, 2019

(87) PCT Pub. No.: WO2018/190848
PCT Pub. Date: Oct. 18, 2018

(65) Prior Publication Data
US 2019/0284414 A1    Sep. 19, 2019

(51) Int. Cl.
| | | |
|---|---|---|
| C09D 11/322 | (2014.01) | |
| C09D 11/38 | (2014.01) | |
| C09D 11/54 | (2014.01) | |
| C09D 11/40 | (2014.01) | |
| C09D 11/326 | (2014.01) | |

(52) U.S. Cl.
CPC .......... *C09D 11/322* (2013.01); *C09D 11/326* (2013.01); *C09D 11/38* (2013.01); *C09D 11/40* (2013.01); *C09D 11/54* (2013.01)

(58) Field of Classification Search
CPC ....... C09D 11/38; C09D 11/54; C09D 11/322; D06P 5/30; D06P 1/6735
See application file for complete search history.

(56) References Cited

U.S. PATENT DOCUMENTS

| | | |
|---|---|---|
| 3,437,502 A | 4/1969 | Warner |
| 4,186,178 A | 1/1980 | Oberlander |

(Continued)

FOREIGN PATENT DOCUMENTS

| | | |
|---|---|---|
| CN | 102190758 | 9/2011 |
| EP | 0728779 | 8/1996 |

(Continued)

OTHER PUBLICATIONS

Author unknown, bulletin for Glycereth-7, http://www.thegoodscentcompany.com/data/rw1300121.html, date unknown.

(Continued)

*Primary Examiner* — Khanh T Nguyen
(74) *Attorney, Agent, or Firm* — Thorpe North & Western LLP

(57) ABSTRACT

A white ink can include an aqueous ink vehicle, from 5 wt % to 25 wt % of white metal oxide pigment having an alumina coating, a dispersant associated with a surface of the white metal oxide pigment, and from 0.05 wt % to 0.5 wt % of amphoteric alumina particles having an average particles size from 2 nm to less than less than 100 nm. The white ink can further include from 0.3 wt % to 1.1 wt % monovalent metal salt, or from 0.005 wt % to 0.175 wt % divalent metal salt, or both.

15 Claims, 5 Drawing Sheets

(56) References Cited

U.S. PATENT DOCUMENTS

| | | |
|---|---|---|
| 4,495,238 A | 1/1985 | Adiletta |
| 4,630,076 A | 12/1986 | Yoshimura |
| 5,990,202 A | 11/1999 | Nguyen et al. |
| 6,184,268 B1 | 2/2001 | Nichols et al. |
| 6,302,536 B1 | 10/2001 | Sarma et al. |
| 6,498,202 B1 | 12/2002 | Sun et al. |
| 6,709,095 B2 | 3/2004 | Sago et al. |
| 6,779,884 B1 | 8/2004 | Ma et al. |
| 6,783,580 B2 | 8/2004 | Tyvoll et al. |
| 6,906,019 B2 | 6/2005 | Niizan et al. |
| 6,936,648 B2 | 8/2005 | Bagwell et al. |
| 7,129,284 B2 | 10/2006 | Ma et al. |
| 7,246,896 B2 | 7/2007 | Askeland et al. |
| 7,388,040 B2 | 6/2008 | Sader et al. |
| 7,696,262 B2 | 4/2010 | Cagle et al. |
| 7,744,205 B2 | 6/2010 | Sarkisian et al. |
| 8,113,643 B2 | 2/2012 | Sarkisian et al. |
| 8,114,923 B2 | 2/2012 | Sarkisian et al. |
| 8,267,505 B2 | 9/2012 | Jolly et al. |
| 8,440,742 B2 | 5/2013 | Cagle et al. |
| 8,540,358 B2 | 9/2013 | Mozel et al. |
| 8,746,869 B2 | 6/2014 | Matsuyama et al. |
| 8,777,390 B2 | 7/2014 | Bruinsma et al. |
| 8,783,842 B2 | 7/2014 | Ingle et al. |
| 8,801,162 B2 | 8/2014 | Matsumoto et al. |
| 8,857,962 B2 | 10/2014 | Goto et al. |
| 9,062,217 B2 | 6/2015 | Gotou et al. |
| 9,133,355 B2 | 9/2015 | Brandstein et al. |
| 9,187,667 B2 | 11/2015 | Doumaux et al. |
| 9,278,515 B2 | 3/2016 | Sarkisian et al. |
| 2003/0087991 A1 | 5/2003 | Engel et al. |
| 2004/0063809 A1 | 4/2004 | Fu et al. |
| 2004/0166252 A1 | 8/2004 | Takashima et al. |
| 2005/0176847 A1 | 8/2005 | Cagle |
| 2005/0206705 A1 | 9/2005 | Ma et al. |
| 2006/0092251 A1 | 5/2006 | Prasad et al. |
| 2007/0060670 A1* | 3/2007 | Ellis .......................... D06P 5/30 523/160 |
| 2007/0084380 A1 | 4/2007 | Cagle et al. |
| 2008/0268156 A1* | 10/2008 | Ueno ................... D06P 1/6735 427/288 |
| 2009/0246377 A1 | 10/2009 | Robertson et al. |
| 2009/0295847 A1 | 12/2009 | Mukai et al. |
| 2010/0173077 A1 | 7/2010 | Ming |
| 2010/0231671 A1 | 9/2010 | Anton et al. |
| 2011/0001779 A1 | 1/2011 | Kida |
| 2011/0071249 A1 | 3/2011 | Bui et al. |
| 2011/0234689 A1 | 9/2011 | Saito |
| 2011/0303113 A1 | 12/2011 | Sarkisian et al. |
| 2011/0318551 A1 | 12/2011 | Nakagawa |
| 2012/0092413 A1 | 4/2012 | Kawamura |
| 2013/0072614 A1 | 3/2013 | Lindstrom et al. |
| 2013/0079447 A1 | 3/2013 | Koike et al. |
| 2013/0201252 A1 | 8/2013 | Namba |
| 2013/0222503 A1 | 8/2013 | Okuda et al. |
| 2013/0330526 A1 | 12/2013 | Song et al. |
| 2014/0141212 A1 | 5/2014 | Fu et al. |
| 2014/0204155 A1 | 7/2014 | Vanbesien et al. |
| 2014/0220314 A1 | 8/2014 | Wu et al. |
| 2014/0220315 A1 | 8/2014 | Zhang et al. |
| 2015/0225586 A1 | 8/2015 | Ingle et al. |
| 2015/0252205 A1 | 9/2015 | Sarkisian et al. |
| 2015/0267073 A1 | 9/2015 | Zhou et al. |
| 2015/0273853 A1 | 10/2015 | Govyadinov et al. |
| 2015/0275007 A1 | 10/2015 | Cagle et al. |
| 2015/0283828 A1 | 10/2015 | Aoai et al. |
| 2015/0368488 A1 | 12/2015 | Robello et al. |
| 2016/0185124 A1 | 6/2016 | Govyadinov |
| 2016/0257154 A1 | 9/2016 | Miyamachi et al. |
| 2016/0312404 A1 | 10/2016 | Pan et al. |
| 2016/0319147 A1 | 11/2016 | Chen et al. |
| 2016/0326391 A1 | 11/2016 | Doumaux et al. |
| 2016/0333209 A1 | 11/2016 | Shimono et al. |
| 2017/0355867 A1 | 12/2017 | Kasperchik et al. |
| 2019/0225828 A1 | 7/2019 | Cagle et al. |

FOREIGN PATENT DOCUMENTS

| | | |
|---|---|---|
| EP | 1403341 | 3/2004 |
| EP | 1403342 | 3/2004 |
| EP | 1561788 | 8/2005 |
| EP | 1586451 | 10/2005 |
| EP | 1586454 | 10/2005 |
| EP | 1403346 | 11/2006 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | 2588245 | 6/2016 |
| SU | 891732 | 12/1981 |
| WO | 03031191 | 4/2003 |
| WO | 2007112337 | 10/2007 |
| WO | 2009128833 | 10/2009 |
| WO | 2011028201 | 3/2011 |
| WO | 2011146069 | 11/2011 |
| WO | 2012008978 | 1/2012 |
| WO | 2014042653 | 3/2014 |
| WO | 2015023274 | 2/2015 |
| WO | 2015041702 | 3/2015 |
| WO | 2015134020 | 9/2015 |
| WO | 2015142335 | 9/2015 |
| WO | 2016092309 | 6/2016 |
| WO | 2016130158 | 8/2016 |
| WO | 2016175738 | 11/2016 |
| WO | 2017009601 | 1/2017 |
| WO | 2017014747 | 1/2017 |
| WO | 2018143957 | 8/2018 |

OTHER PUBLICATIONS

ChemSpider bulletin for Glycereth-3, http://www.chemspider.com/Chemical-Structure.80131.html; date unknown.

Disperal/Dispal High purity dispersible aluminas, www.sasol.com, 2003, 10 pages.

International Search Report dated Sep. 14, 2018 for PCT/US2017/027428, Applicant Hewlett-Packard Development Company, L.P.

* cited by examiner

WHITE INKS

BACKGROUND

The use of inkjet printing systems has grown in recent years. This growth may be attributed to desirability in print resolution and overall print quality coupled with appreciable reduction in cost. Today's inkjet printers offer acceptable print quality for many commercial, business, and household applications at lower costs than comparable products available just a few years ago. Notwithstanding their recent success, research and development efforts continue toward advancing inkjet print quality over a wide variety of different applications, but there remain challenges.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1A:
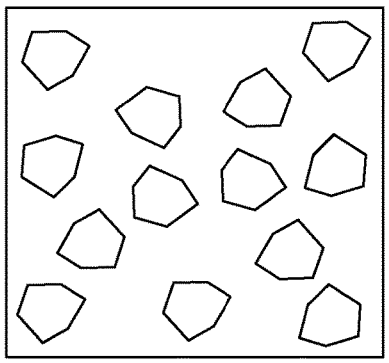
FIG. 1A depicts dispersed white metal oxide pigment.

Reference will now be made to certain technology examples illustrated, and specific language will be used herein to describe the same. It will nevertheless be understood that no limitation of the scope of the disclosure is thereby intended.

DETAILED DESCRIPTION

Certain pigments can be more challenging than other in achieving certain desirable printing and jetting properties. For example, ink opacity corresponding to white color appearance can be more difficult to achieve for white inks compared to black, magenta, or cyan inks. Additionally, high colorant loads and large pigment particle sizes can lead to settling that clogs inkjet print heads and other microchannels. More specifically, the combination of high bulk densities and larger particle sizes tend to lead to high settling rates of the pigment in water-based inkjet ink formulations, and these larger and denser pigments can form a sediment very rapidly, e.g., within a few days. Once the sediment has formed, the gravitational forces tend to lead to a tight compaction or cemented sediment, which is very challenging to resuspend, plugging ink feed tubes, print heads and microchannels, etc. Prolonged stirring or shaking may not be sufficient to break down the aggregated particles in the sediment to unclog blocked channels and restore the settled ink to its original useable state. Furthermore, irreversible pigment settling can also reduce print quality because the formation of non-redispersible pigment sediment depletes bulk pigment concentration in the ink liquid portion that remains, compromising print opacity. In a more extreme case, settling in a manner where resuspension cannot easily be achieved may even render the ink substantially transparent. Additionally, in common use, white ink supply containers may sit idle for months in storage without remixing. Thus, pigment can settle and compact over this time period. When this occurs, the person installing the ink supply container into a printer may not be able to re-suspend the pigment in a reasonable amount of time, such as 30 to 60 shakes.

Thus, the present disclosure is drawn to white inks, including water-based white inkjet inks, that can be jetted from various types of inkjet print heads, but which can also be friendly for use in thermal inkjet print heads. These inks, in some instances with the assistance of a fixer coating layer or fixer ink, can be printed not only on porous media, but also effectively on more challenging non-porous polymer media.

In accordance with this, a white ink can include an aqueous ink vehicle, and from 5 wt % to 25 wt % of white metal oxide pigment having an alumina coating, e.g., an alumina-containing coating of alumina or of amorphous-silicate (aluminosilicate which is a combination of both alumina and silica), etc. In one non-limiting example, the metal oxide pigments can have an average particulate size from 200 nm to 700 nm. A dispersant can also be associated with a surface of the metal oxide pigment. The white ink can also include from 0.05 wt % to 0.5 wt % of amphoteric alumina particles dispersed in the aqueous ink vehicle. The amphoteric alumina particles can have an average particles size from 2 nm to less than less than 100 nm, for example. The white ink can further include from 0.3 wt % to 1.1 wt % monovalent metal salt, or from 0.005 wt % to 0.175 wt % divalent metal salt, or both. In one example, the monovalent salt can be present at from 0.3 wt % to 0.7 wt %, or from 0.4 wt % to 0.55 wt %. In another example, the divalent salt can be present at from 0.01 wt % to 0.15 wt %, or from 0.05 wt % to 0.13 wt %.

In one example, the monovalent metal salt can include an ionic strength from 20 mM to 135 mM (millimolar or millimoles per liter), and/or divalent metal salt having an ionic strength from 1 mM to 30 mM. "Ionic strength," I, can be defined as $$I = \frac{1}{2}\sum_{i=1}^{n} c_i z_i^2$$

where $c_i$ is the molar concentration of the ion I (M, mon) and $z_i$ is the charge number of that ion. The sum can be taken over all of the ions in the solution. In further detail, with respect to colloidal stability theory, the Deby-Hukel screening length can be calculated in terms of ionic strength (rather than straight salt concentration). For negatively charged particles, it is can be observed that alkaline ions have a stronger effect than suggested by the screening length. In accordance with this, in some examples, calcium may form a complex with carboxylates on a dispersant. In more specific detail, the ionic strength of the monovalent metal salts can be from 25 mM to 80 mM, from 25 mM to 60 mM, from 25 mM to 50 mM, from 30 mM to 60 mM, or from 30 mM to 50 mM. Example monovalent salts can include $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, or a combination thereof. In other examples, divalent salts can provide a stronger effect than at equivalent ionic strengths of monovalent salts. The ionic strength of divalent salt can be from 1 mM to 30 mM, from 2 mM to 30 mM, from 3 mM to 20 mM, from 5 mM to 15 mM, or from 9 mM to 24 mM. Example divalent salts can include $Ca(NO_3)_2$, $Mg(NO_3)_2$, $CaCl_2$, $MgCl_2$, or a combination thereof. Notably, the term "monovalent" refers to a single charge on the metal cation, such as potassium or sodium, and does not refer to the anion, such as nitrate or sulfate, "Divalent" also refers to the metal cation, not the corresponding anion.

The white metal oxide pigment can include titanium dioxide particles, zinc oxide particles, zirconium oxide particles, or combinations thereof. The white metal oxide coating can include alumina, such as alumina or an admixture of alumina and silica, e.g., amorphous-silicate (aluminosilicate). The average particles size of the metal oxide pigment can be from 200 nm to 700 nm, for example. In one specific example, the white ink can further include latex particles dispersed therein, e.g., having a glass transition temperature from −20° C. to 130° C. The dispersant can include a non-ionic or predominantly non-ionic polymeric dispersant defined by an acid number not higher than 100 mg KOH/g based on dry polymer weight. This dispersant may further include an anionic anchoring group attached to the white metal oxide pigment or an alumina-containing coating of the white metal oxide pigment. In one example, the dispersant can include an anionic dispersant defined by having an acid number higher than 100 mg KOH/g based on dry polymer weight attached to the aluminosilicate coating. A single dispersant or multiple dispersants may be used. Thus, the white metal oxide pigment and the amphoteric alumina particles can be suspended in the white ink when the white ink is in an agitated state, and the white metal oxide pigment and the amphoteric alumina particles can be in the form of a weakly associated flocculated mass upon settling of solids in the white ink. The monovalent or divalent metal salt can contribute to providing an acceptable weekly associated flocculated mass that is more easily resuspended prior to use.

In another example, a method of making a white ink can include milling from 5 wt % to 40 wt % amphoteric alumina particles in a water-based carrier including an acid to form an acidified alumina dispersion slurry with amphoteric alumina particles having a particle size from 2 nm to less than less than 100 nm, and admixing the acidified alumina dispersion with an aqueous ink vehicle which includes a monovalent metal salt or a divalent metal salt. In further detail, the monovalent metal salt can be added to provide a monovalent salt concentration from 0.3 wt % to 1.1 wt %, or a divalent salt concentration from 0.005 wt % to 0.175 wt % divalent metal salt, or both. In one example, the monovalent salt can be added to achieve from 0.3 wt % to 0.7 wt % or from 0.4 wt % to 0.55 wt % monovalent. In another example, the divalent salt can be added to achieve from 0.01 wt % to 0.15 wt % or from 0.05 wt % to 0.13 wt % divalent salt.

In one example, the monovalent metal salt can be added to provide an ionic strength in the white ink at from 20 mM to 135 mM, or the divalent metal salt can be added to provide an ionic strength in the white ink at from 1 mM to 30 mM, or both. Ionic strength subranges described herein can likewise be used. An additional step can include adding white metal oxide pigment during the milling step or during the admixing step to form the white ink. The white metal oxide pigment can include an alumina coating, e.g., alumina or aluminosilicate. In one example, amphoteric alumina particles and can have an average particulate size from 200 nm to 700 nm.

In further detail regarding the method, in one example, the acid can be nitric acid, sulfuric acid, or hydrochloric acid, and/or the acidified alumina dispersion slurry has a pH from 3 to 5, e.g., about pH 4. The method can further include destabilizing the white metal oxide pigment and the amphoteric alumina particles in the white ink to form a flocculated mass. In one example, the method can further include resuspending the white metal oxide pigment and the amphoteric alumina particles in the white ink to form an inkjettable white ink. An additional step can include adding latex particles to the aqueous ink vehicle either prior to, at the same time, or after admixing with the acidified alumina dispersion. Thus, in one example, the method can be carried out to prepare a white ink including from 5 wt % to 25 wt % of the white metal oxide pigment, from 0.05 wt % to 1 wt % of polymeric dispersant, from 0.05 wt % to 0.5 wt % of the amphoteric alumina particles, and from 2 wt % to 30 wt % latex particles.

In another example, a fluid set for inkjet imaging can include a white ink and a fixer fluid including an aqueous fixer vehicle and from 0.1 wt % to 25 wt % cationic polymer. The white ink can be as described herein. For example, the white ink can include an aqueous ink vehicle; from 5 wt % to 25 wt % of white metal oxide pigment having an alumina coating, e.g., alumina or aluminosilicate; a dispersant associated with a surface of the metal oxide pigment; from 0.05 wt % to 0.5 wt % of amphoteric alumina particles dispersed in the aqueous ink vehicle, wherein the amphoteric alumina particles have an average particles size from 2 nm to less than less than 100 nm; and from 0.3 wt % to 1.1 wt % monovalent metal salt, or from 0.005 wt % to 0.175 wt % divalent metal salt, or both. In one example, the monovalent salt can be present at from 0.3 wt % to 0.7 wt %, or from 0.4 wt % to 0.55 wt %. In another example, the divalent salt can be present at from 0.01 wt % to 0.15 wt %, or from 0.05 wt % to 0.13 wt %. In further detail, ionic strength concentration ranges can likewise be used to formulate the white ink as described herein. The white ink can likewise be formulated for inkjet application upon agitation to resuspend white metal oxide pigment and the amphoteric alumina particles. The fixer fluid can be formulated for inkjet application having a viscosity from 1 cP to 35 cP at 25° C., or it can be formulated for analog application having a viscosity from 1 cP to 500 cP at 25° C. Example analog applications can include rolling, brushing, curtain coating, blade coating, Meyer rod coating, etc.

It is noted that when discussing the white inks, methods, and/or fluid set, each of these discussions can be considered applicable to each of these examples, whether or not they are explicitly discussed in the context of that example. Thus, for example, in discussing ionic strength related to the white ink or to the white ink in the fluid set, such disclosure are also relevant to and directly supported in the context of the methods described herein, and vice versa.

Figure 1B:
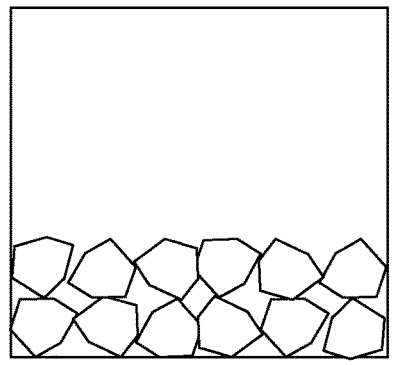
FIG. 1B depicts typical settling that occurs with white metal oxide pigment.

The white inks, methods, and ink sets of the present disclosure address issues related to system reliability and print opacity performance of white inks that use relatively large and dense white metal oxide pigment particles. To illustrate, high bulk density of white metal oxide pigment, such as $TiO_2$, which have a relatively large particle size, e.g., from 200 nm to 700 nm, from 150 nm to 750 nm, or from 200 nm to 500 nm, or from 300 nm to 350 nm, can be used to provide high opacity performance. However, the high bulk density, e.g., about 4.2 for the rutile form, and large size also can result in fast settling of the pigment in low viscosity water-based inkjet ink formulations. More specifically, $TiO_2$ particles (See FIG. 1A) can easily agglomerate resulting in a sediment (See FIG. 1B) that is difficult to break apart, e.g., layers with very strong inter-particle cohesion are formed. This can clog fluidic pathways of ink delivery systems and inkjet print heads, rendering the printing device non-operational within few days.

Figure 1C:
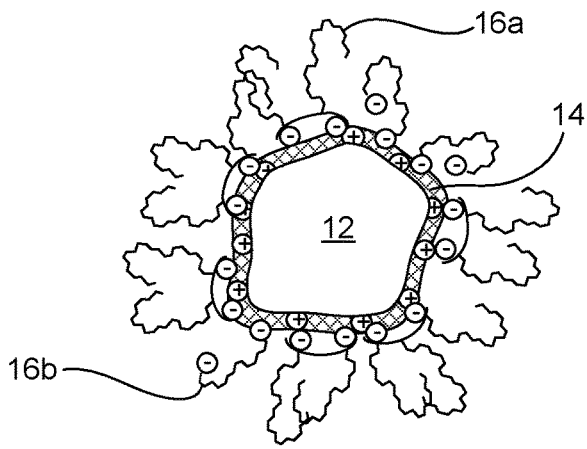
FIG. 1C depicts an example white, surface treated metal oxide pigment dispersed by polymeric dispersant in accordance with the present disclosure.
Figure 1D:
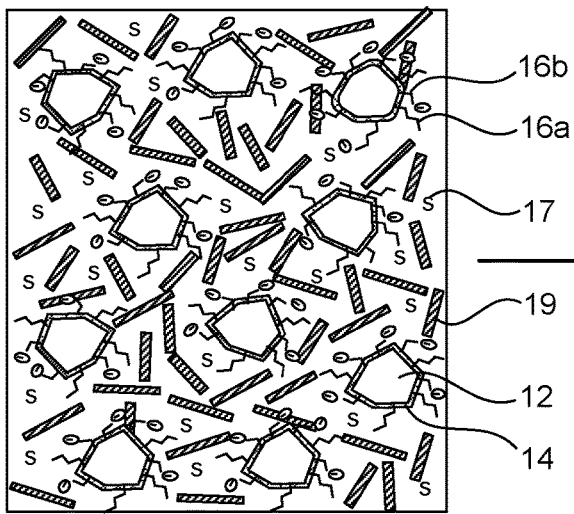
FIG. 1D depicts example white metal oxide pigment that is co-dispersed with amphoteric alumina particles in the presence of a monovalent or divalent salt in accordance with the present disclosure.
Figure 1E:
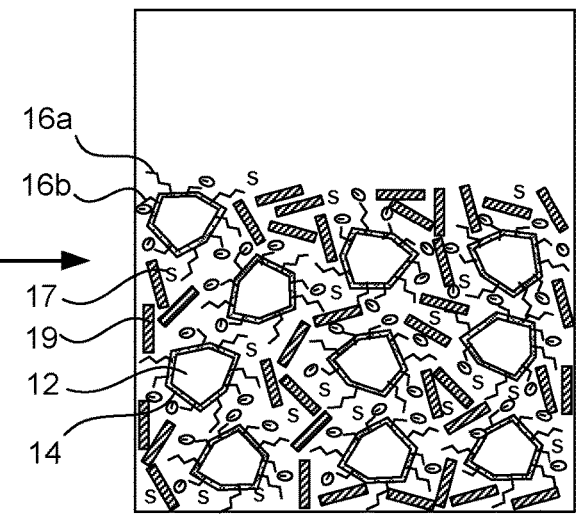
FIG. 1E depicts example settling that can occur to the dispersion shown in FIG. 1D, where the dispersion forms flocculated masses over time in accordance with the present disclosure.

Because it can be difficult to eliminate settling of large dense particles in low viscosity environments, reducing settling rate or allowing for settling in a manner that produces a more easily resuspendable sediment provides a reasonable solution. For example, as shown in FIG. 1C, an example white metal oxide pigment 12, such as $TiO_2$, is shown with an alumina-containing coating 14, e.g., alumina, aluminosilicate which is an amorphous silicate coating with both alumina and silica, etc. Chemours™ R900 is an example of a pigment that has an alumina coating, and Chemours™ R960 is an example of a pigment that has an amorphous silicate coating with both alumina and amorphous silica. A layer of two different types of polymeric dispersant are also shown as present, namely an adsorbed non-ionic or predominantly non-ionic polymer dispersant of a comb-type structure with anionic or acidic anchor group 16a, as well as an anionic dispersant 16b. Though two dispersants are shown, it is noted that many examples can be prepared with only one dispersant, or more than two dispersants. Thus, in accordance with examples of the present disclosure, as shown in FIGS. 1D and 1E, white metal oxide pigment 12 can be treated with alumina 14 (with or without silica) to form a coating, and the coated pigment can be further dispersed with a polymeric dispersing agent 16a and/or 16b with added monovalent or divalent metal salt 17 and amphoteric alumina particles 19 also included therein (See FIG. 1D). This formulation does not stop gravitational settling, but rather, provides conditions where a loose flocculated mass of pigment and amphoteric alumina particles (See FIG. 1E) are formed that can be easily resuspended with minor agitation or shaking. Essentially, by milling alumina-coated white metal oxide pigment with the polymeric dispersant and by adding amphoteric alumina particles and increasing the ionic strength of the ink with added monovalent or divalent metal salt, the various particles form flocs or flocculated masses that allow for a more controlled destabilization of the pigment in the aqueous ink vehicle. By allowing sedimentation of the weakly associated colloid particles to occur (as loose flocs or flocculated masses), a fluffy sediment of low density is formed that can be easily resuspended without permanent clogging of the inkjet print head and/or fluid channels. Thus, when settling, more benign flocculated masses of white metal oxide pigment form (rather than tightly packed pigment that is unrecoverable). In other words, these solids allow for a controlled destabilization of the pigment in the aqueous ink vehicle, e.g., allowing weakly associated sedimentation of colloid particles to occur (as loose flocs) such that fluffy sediment of lower density flocs can be easily resuspended. Furthermore, these solids may also cooperate with other solids, e.g., the latex particles if present, to act as a spacer between white metal oxide pigment particles, thereby enhancing white print opacity, as will be described herein in greater detail.

In further detail, amphoteric alumina particles alone, such as boehmite, can provide some benefit when it comes to causing a lower density settling and thus easier resuspension. However, achieving desirable settling properties using only boehmite in some instances is not always enough, particularly in some instances in inks where a diafiltered latex might also be present. To improve this, increasing the ionic strength of the ink by adding a monovalent or divalent metal salt can provide improved results compared to inks that may not include added salt. In other words, by bringing the ionic strength of metal salt in the ink (to a range of from 20 mM to 135 mM using $K_2SO_4$ or some other monovalent salt, and/or or to a range of 1 mM to 30 mM using $Ca(NO_3)_2$ or some other divalent salt) in combination with the addition of boehmite, looser and thicker sediments can be formed. This provides for inks that are more easily resuspendable after settling, generally forming reproducibly thicker sediments.

In one example, potassium sulfate can be added, as it or another monovalent salt may already be present as an electrolyte (in lower concentrations) as a byproduct of a potassium persulfate latex initiator and because of its inertness. However, it is understood that the residual amounts of this salt that may be inherently present can be less than the concentration of monovalent salt described in conjunction the present disclosure, e.g., from 5 mM to 17 mM monovalent salt based on ionic strength. Thus, the monovalent salt can be affirmatively added to reach an appropriate concentration that improves or loosens the sediment upon settling. As potassium cations may be present anionically charged particles, salt can be added at a range that is equivalent to 3.3 mM to 8 mM of potassium ions or more. Suitable monovalent metal salts that can be used include $K_2SO_4$, as mentioned, as well as $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$ $NaH_2PO_4$, $Na_2HPO_4$, or combinations thereof. Alternatively (or additionally), divalent metal salt can be added to bring up the ionic strength of the salt in the ink to 1 mM to 30 mM. In one example, as calcium cations may associate with anionically charged particles, salt can be added at a range that is equivalent to ⅓ to ⅔ mM of calcium ions, without limitation. Suitable salts that can be used include $Ca(NO_3)_2$, as mentioned, as well as $Mg(NO_3)_2$, $CaCl_2$, and $MgCl_2$.

In further detail, regarding the amphoteric alumina particles, it is noted that these particles can have both cationic and anionic sites when exposed to aqueous environment over a wide pH range, and can be used as added particles in the white inks of the present disclosure. Surface hydroxyl groups of such aluminum oxides, may adsorb protons and form cationic sides, as follows:

$$AlOH + H^+ \rightarrow AlOH_2^+$$

On the other hand surface hydroxyls may be also deprotonated and form anionic sites:

$$AlOH + OH^- \rightarrow AlO^- + H_2O$$

The distribution of surface charges on nano-particles of some amphoteric aluminum oxides may be anisotropic. This behavior is especially pronounced for aluminum oxo-hydroxide AlO(OH), also known as boehmite. This is because boehmite nano-particles in aqueous dispersions can easily aggregate into complex network of structures. TEM evidence of aggregation of boehmite nano-particles into continuous 3-dimensional network (viewed under magnification, e.g., ~200K) indicates the formation of these structures. Furthermore, boehmite nano-particles, and other amphoteric alumina particles, can attach or adsorb to a surface of metal oxide particles, including white metal oxide pigments described herein, to further assist with achieving the flocculated masses described herein.

In further detail, amphoteric alumina particles, such as boehmite nano-particles, can self-aggregate and adsorb to surface of large white metal oxide particles and can further be suspended in a white ink for providing controlled destabilization of white ink formulations. To illustrate, titanium dioxide ($TiO_2$) pigment particles in ink formulation can agglomerated into loose flocs as shown previously in FIG. 1E where a network of amphoteric alumina oxide particles with large pigment particles become trapped inside the network with the assistance of the added monovalent salt. Settling of these loose flocs or flocculated masses produces loose low-density sediment with very weak mechanical properties. Minor agitation, such as might occur with ink recirculation in the inkjet printer print head and/or ink supplies can be sufficient for quick system recovery into an operational state after long term inactivity.

A variety of water-dispersible alumina nano-powders and commercially available premade alumina dispersions can be used in the formulations of the present disclosure to provide the amphoteric alumina particles. In some examples, the amphoteric alumina particles can have a particle size in the ink that is smaller than that of white metal oxide pigment, e.g., from 2 nm to less than less than 100 nm, from 2 nm to 50 nm, from 2 nm to 25 nm, or from 10 nm to about 15 nm, on average. For example, when using water-dispersible dry powders, a stock amphoteric alumina (nano) particle dispersion may be produced by milling the powder in aqueous environment at a pH from about 3.5 to about 5. The nano-particles can be premilled and added to the white ink, or can be milled with the alumina-coated white metal oxide pigment and polymeric dispersant.

In one specific example, a suitable amphoteric alumina particles (boehmite) nano-particle dispersion can be prepared by mixing Dispal® 23N4-80® alumina powder pre-acidified with nitric acid. (available from Sasol GmbH) in a mixing vat with a propeller mixer. Dispal 23N4-80 is about 80 wt % Alumina $Al_2O_3$, 1.65 wt % nitrate, and the balance water, with a combination of adsorbed water and the mineral represented by the formula AlO(OH). The slurry can include about 5 wt % to 40 wt % of the Dispal® 23N4-80® alumina, in some examples. The particle size of the amphoteric alumina particles after milling can result ranging from about 2 nm to less than 100 nm, or more specifically, from about 2 nm to less than 100 nm, or from about 10 nm to about 50 nm, on average.

These white inks can be characterized in some examples as "non-Newtonian," especially when pigment and amphoteric alumina particles are concentrated in a volume of ink due to settling. The non-Newtonian properties of the well mixed ink may be weak, and thus, the non-Newtonian rheology may be more pronounced in the ink sediments. A non-Newtonian fluid is a fluid that does not follow Newton's Law of Viscosity, in that they are not predictable with respect to their ability to resist gradual deformation by shear or tensile stresses. Non-Newtonian fluids are more dependent on shear rate or shear rate history, for example. Thus, the white inks or a white dispersions used to prepare the white ink can have "non-Newtonian" or "shear thinning" properties in relation to higher concentrations of weakly bound agglomerates or flocculated masses. For example, a non-Newtonian ink or dispersion may be defined such that the viscosity of an ink or dispersion measured at 10 sec$^{-1}$ shear rate is at least 10% higher than the viscosity of the ink or dispersion when measured at shear rate of 1000 sec$^{-1}$ at 25° C. Or, for example, a non-Newtonian ink or dispersion may have a viscosity measured at 10 sec$^{-1}$ shear rate that is at least 20% higher, 30% higher, 50% higher, 100% higher (2×), etc. than the viscosity of the ink or dispersion when measured at shear rate of 1000 sec$^{-1}$ at 25° C. In many examples, the shear rate difference can be much higher than 2 times, e.g., 5 times, 10 times, 20 times, etc. Thus, a white ink, depending on the concentration of pigment (with alumina coating and polymeric dispersant) and amphoteric alumina particles, can have a non-Newtonian character when the "colorant" and amphoteric alumina particles are in the form of a flocculated mass, and the non-Newtonian properties are reduced when the colorant is re-suspended in preparation for inkjet application, for example.

These white inks can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the white ink to immobilize the white metal oxide pigment.

Figure 2:
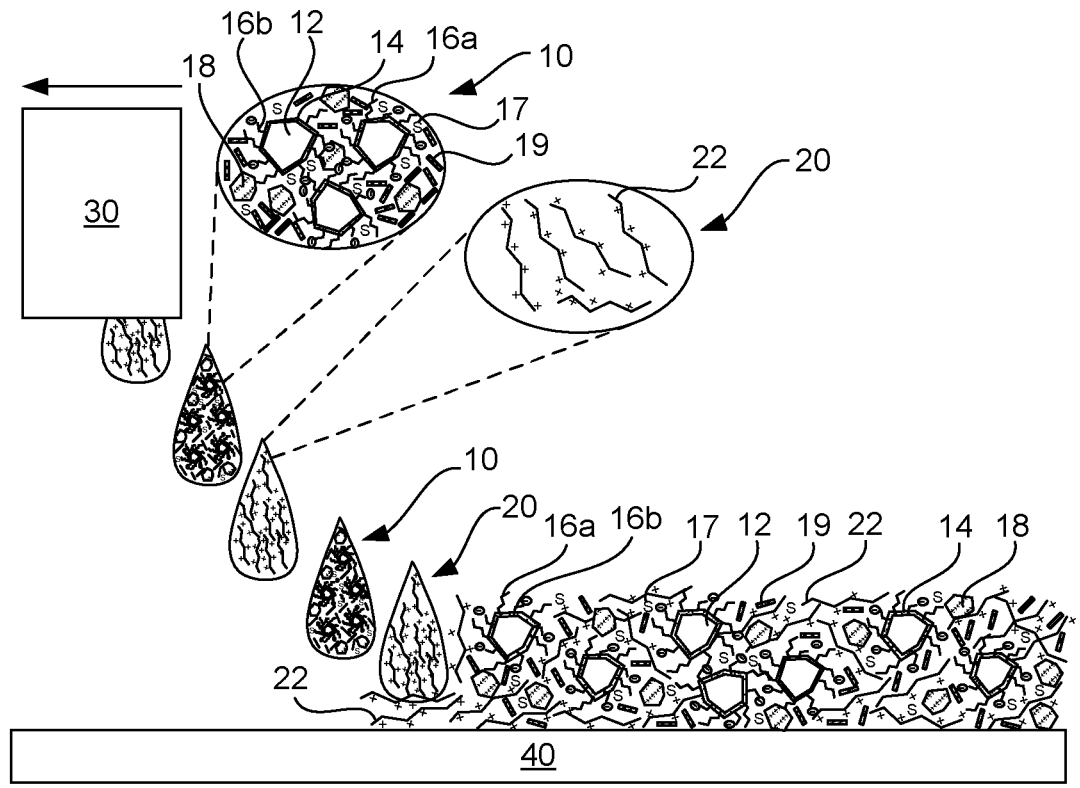
FIG. 2 depicts examples where a cationic polymer formulation is digitally printed on a media substrate contemporaneously or just before printing a white inkjet ink thereon, and wherein the white inkjet ink is prepared in accordance with examples of the present disclosure.
Figure 3:
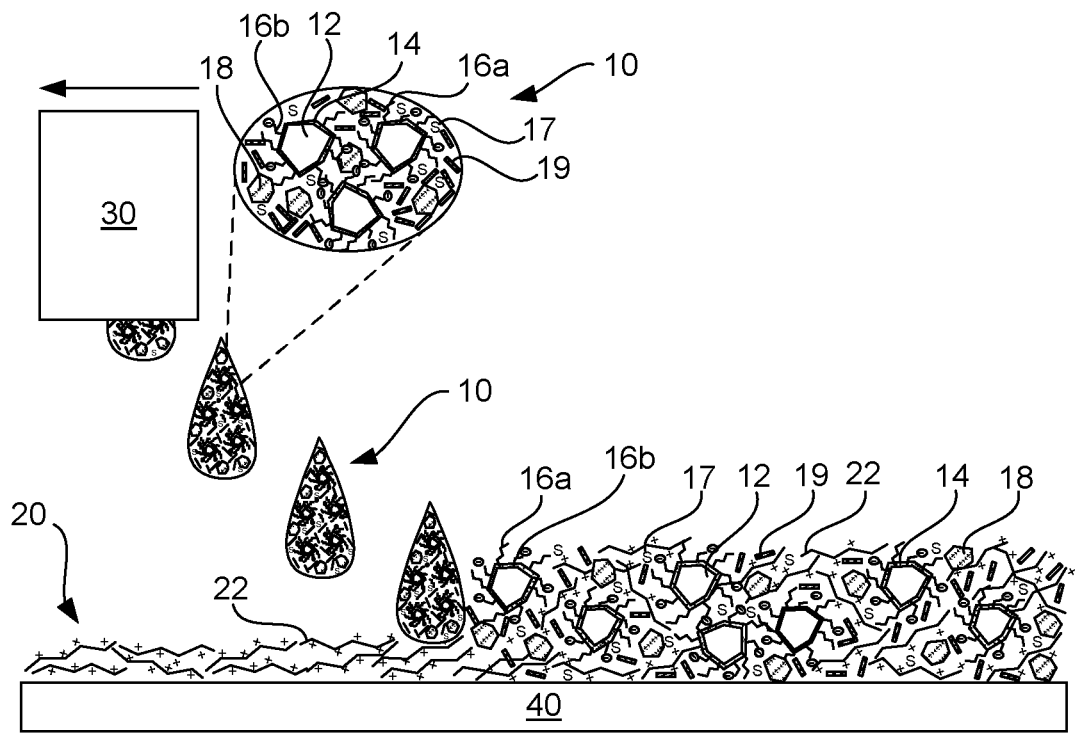
FIG. 3 depicts examples where a cationic polymer is applied to a media substrate prior to (either digital or by analog application) printing a white inkjet ink thereon, and wherein the white inkjet ink is prepared in accordance with the present disclosure.

FIG. 2 depicts an example where a digitally printed fixer is applied just prior to or essentially simultaneously with a white inkjet ink of the present disclosure. FIG. 3 depicts an example where a fixer is applied to a media substrate prior to application of an inkjet ink. The fixer in this latter example can likewise be applied by digital printing, or alternatively, by analog application, e.g., rolling, brushing, curtain coating, blade coating, Meyer rod coating, or any other coating methodology suitable for producing thin layer of fixer on the printed substrate, etc. As shown in FIGS. 2 and 3, an inkjet printing device 30 is provided to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 2 shows the fixer composition being printed digitally from the printing device, and FIG. 3 shows the fixer composition being pre-applied to the media substrate, either digitally or by an analog coating method. In both examples, the white inkjet ink includes suspended white colorant that includes a white metal oxide pigment 12 with an alumina coating 14 and associated with polymeric dispersants 16a, 16b. In this specific example, there are two types of polymeric dispersants, namely a non-ionic or predominantly non-ionic dispersant 16a and a short-chained anionic dispersant 16b, but this is not required. Latex particles 18 are also shown in the ink, all suspended by an aqueous ink vehicle, which typically includes water, organic co-solvent, and the like. Additionally, amphoteric alumina particles 19 are also co-dispersed therewith to assist in providing non-Newtonian or sheer thinning behavior to the white ink. In still further detail, the white ink also includes a monovalent metal salt 17, which provides even more resistance to tight packing/settling than when the amphoteric alumina particles are included without the added monovalent salt.

Regarding the fixer composition 20, this formulation can include cationic polymer 22 dissolved in a fixer vehicle, wherein the cationic polymer is interactive with the suspended white colorant or other anionic components that may be found in the white ink, thereby providing some immobilization or freezing of the pigment and particles on the print media substrate.

Figure 4:
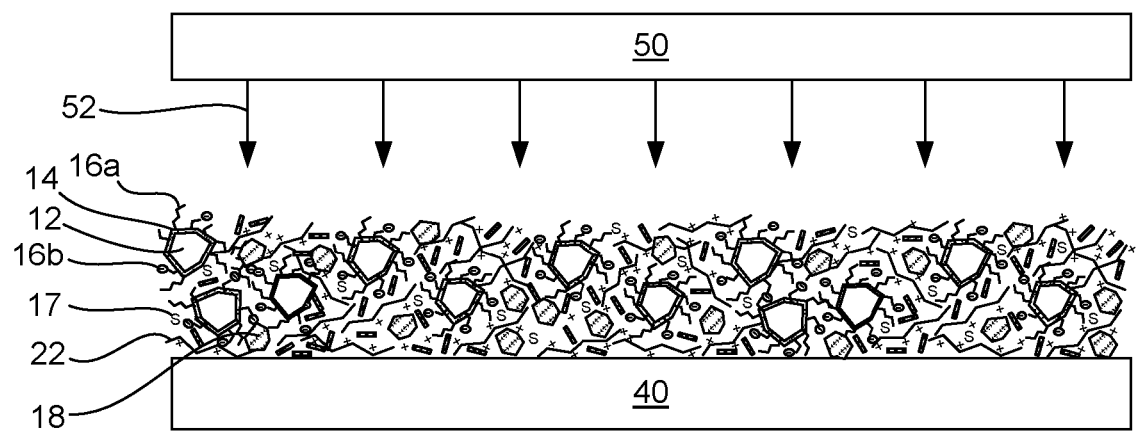
FIG. 4 depicts examples of heat drying and fusing an image printed in as described in FIG. 2 or 3 in accordance with the present disclosure.
Figure 5:
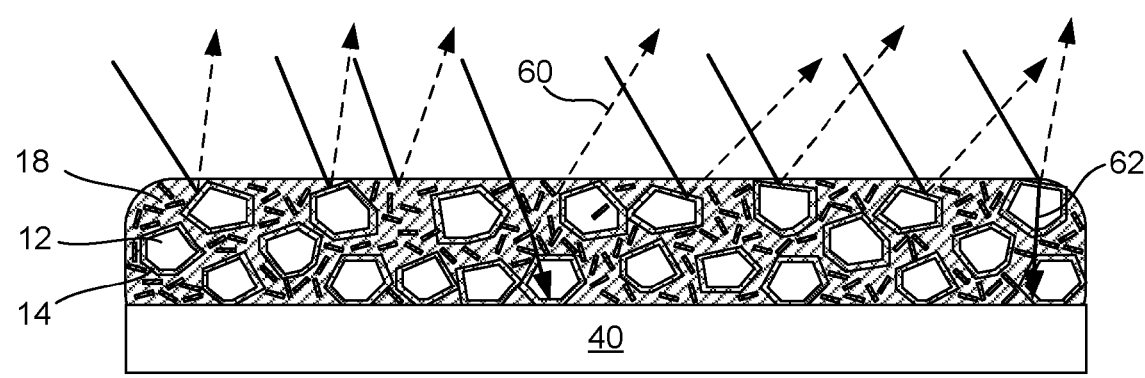
FIG. 5 depicts a printed article, such as that shown in FIG. 4, after heat fusing on a media substrate in accordance with examples of the present disclosure.

In another example, the image printed or otherwise generated in accordance with FIGS. 2 and 3 can be heat fused. More specifically, FIG. 4 shows a heat fusing device 50 which is used to apply heat 52 to the printed article to form a heat fused printed article as shown in FIG. 5. Notably, the reference numerals from FIGS. 2 and 3 are carried forward to those shown in FIGS. 4 and 5. In FIG. 5 in particular, because of the presence of both the alumina coating 14, the amphoteric alumina particles 19, and the latex particles 18 (heat fused as a non-continuous mass with other polymers that may be present) providing spacing between white metal oxide pigment particles 12, there can be enhanced light scattering 60 and lower transmittance 62 than even more densely packed white metal oxide pigment, which thus provides enhanced opacity. This increased opacity can be achieved by optically spacing the white metal oxide pigment from one another. For example, because of the relative high refractive index of the white metal oxide pigment and the relative low refractive index optical spacing provided by the amphoteric alumina particles, latex, etc., the opacity of the printed coating can be boosted by from 0.1% to 25%, or more typically from 5% to 20% or from 5% to 25% compared to an inks without optical spacing material. In other words, the crowding effect of tightly-packed high refractive index (n) particles with little or no voids decreases light scattering and increase transparency of the coating. By optically spacing the white metal oxide pigment with the low refractive index materials (and typically heat fusing the latex after printing), an increase in opacity can be realized. As a further point, fusion can add enhanced durability to the printed article. In some cases, the fusing of the latex particles may help the latex polymer distribute more evenly between light scattering white metal oxide pigment particles and, hence, further enhance opacity as well. That, in combination with the presence of the alumina coating, can provide desirable results.

In accordance with this, a printed article can include up to 80 gsm, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 75 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Turning now to the various specific other ingredients that may be present in the white ink, other than the amphoteric alumina particles and the monovalent salts described above, the inks can include white metal oxide pigment. This pigment solid can provide a white color due to its large size and refractive index, e.g., refractive index of 1.8 to 3.0. These pigments can also have a bulk density from 3.0 to 4.5, for example. Thus, the same properties that make this pigment a good white colorant for use in an ink also contributes to the settling characteristics for the pigment in the ink, e.g., the size of pigment and the bulk density of pigment tends to settle rather quickly. As a partial solution, coating the white metal oxide pigment with alumina and associating the surface with polymeric dispersant can be carried out. Furthermore, however, by adding amphoteric alumina particles and monovalent salt, when settling does occur, the white colorant can be easily resuspended from the white flocculated colorant mass in preparation for inkjet application. Thus, when resuspended, a homogenous or evenly distributed pigment dispersion can be readily formed from the flocculated colorant mass.

In further detail, the "white" pigment provides much of the white coloration to the ink, though without the other ingredients in the ink, individual pigment particles may have some transparency or translucency. Examples of white metal oxide pigments that can be used include titanium dioxide particles, zinc oxide particles, zirconium oxide particles, combinations thereof, or the like. In one specific example, the white metal oxide pigment can be titanium dioxide ($TiO_2$), and even more specifically, rutile. Thus, the white inks of the present disclosure are based on transparent metal oxide pigment particles with very high refractive index, that when spaced appropriately, provide very opaque and white print layers.

Pigments with high light scattering capabilities, such as these, can be selected to enhance light scattering and lower transmittance, thus increasing opacity. White metal oxide pigments can have a particulate size from about 200 nm to 700 nm, or from 300 nm to about 600 nm, or more typically, from about 400 nm to 550 nm, and in still another example, from about 180 nm to 400 nm. The combination of these pigments within these size ranges, appropriately spaced from one another with ingredients such as the alumina coating, amphoteric alumina particles, and latex particles, high opacity can be achieved at relatively thin thickness, e.g., 5 gsm to 60 gsm or 5 gsm to 50 gsm after removal of water and other solvent(s) from the printed ink and fixer film.

Examples of alumina-coated pigment that can be used include Ti-Pure® 960, available from Chemours, which has an alumina content of about 3.3 wt % and an amorphous silica content of about 5.5 wt % based on the pigment content, and thus, when milled with polymeric dispersant, can form the suspended flocs, which may be easily resuspended when formulated with the amphoteric alumina particles and monovalent salts of the present disclosure. Other coated pigments that can be used include TR® 50 (2.6 wt % alumina coating), TR® 52 (3.4 wt % alumina coating), TR60 (3.1 wt % alumina coating), TR® 90 (4 wt % alumina coating), and TR® 93 (3.9 wt % alumina coating), each from Huntsman Chemical; Ti-Pure® R900 (4.3 wt % alumina coating) and Ti-Pure® R931 (6.4 wt % alumina coating), each available from Chemours; and CR®-813 (3.5 wt % alumina coating) and CR®-828 (3.5 wt % alumina coating), each available from Chemours. Notably, these coating weight percentages are based on the pigment weight, and furthermore, silica may also be included with these coatings at various concentrations either greater than or less than the alumina content.

In further detail regarding the alumina coating that can be applied to the white metal oxide pigment, any of a number of alumina compositions can be used. The alumina can be coated on the pigment by precipitation from a liquid phase, and in some examples, there are commercially available alumina-containing $TiO_2$ pigments (or other white metal oxide pigments) that can be used. These commercially available pigments which include alumina can be milled with polymeric dispersant, as described in greater detail hereinafter. Essentially, however, when amphoteric alumina particles and white metal oxide pigment is co-milled with polymeric dispersant in an aqueous environment, a large number of gel-coat particles can be formed, similar to that shown in FIGS. 1C and 1D.

Regarding the polymeric dispersants per se, any of a number of polymeric dispersants can be used. For example, a short-chain anionic dispersant can be used, a non-ionic or predominantly non-ionic dispersing agent, and/or any other dispersant effective for dispersing the white metal oxide pigment. Suitable dispersing agents can allow for dispersability and stability in an aqueous ink environment, as well as for contributing to a controlled destabilizing effect (along with the alumina coating) when the white metal oxide pigment settles and forms a white flocculated colorant mass. These dispersants can also be prepared to have little to no impact on the viscosity of the liquid phase of the ink, as well as retain good print head reliability in thermal inkjet print heads (if the ink is a thermal inkjet ink). If the ink is a piezo inkjet ink, then additional flexibility regarding viscosity is tolerable. Dispersant of one or various types can each be present in the inks of the present disclosure at various concentrations, such as from 0.05 wt % to 1 wt %.

For definitional purposes, "short-chain anionic dispersants" that can be used include polymeric dispersants with chain length short enough to impact viscosity of ink formulation at moderate concentrations, typically having an acid number higher than 100 mg KOH/g based in dry polymer content. For example, short-chain anionic dispersants can include dispersants having a weight average molecular weight lower than 30,000 Mw, or more typically, lower than 15,000 Mw, e.g., 1,000 Mw to 30,000 Mw, or from 2,000 Mw to 15,000 Mw.

Also for definitional purposes, "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is typically not higher than 100 mg KOH/g, and is typically not higher than 50 mg KOH/g, or even not higher than 30 mg KOH/g. That being stated, in one example, non-ionic dispersing agent with no anionic properties can be used. These non-ionic or predominantly non-ionic dispersants can range in average molecular weight from 500 Mw to 50,000 Mw, in certain examples.

Turning now to the short-chain anionic dispersants, examples include polymers and/or oligomers with low weight average molecular weight. More specifically, low molecular weight (Mw) short-chain anionic dispersants can include acrylic and methacrylic acids homopolymers such as polyacrylic acid (PAA), polymethacrylic acid (PMAA), or their salts. More specific examples include, but are not limited to, Carbosperse® K-7028 (PAA with M-2,300), Carbosperse® K-752 (PAA with M-2,000), Carbosperse® K-7058 (PAA with M-7,300), Carbosperse® K-732 (PAA with M-6,000), Carbosperse® K-752 (Na salt of PMAA with M-5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Referring now to the non-ionic dispersants that can be used, examples include water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190, Disperbyk® 191, Disperbyk® 193, Disperbyk® 194 N, Disperbyk® 199, Disperbyk® 2060 and Disperbyk® 2062 available from BYK Chemie, as well as Dispersogen® PCE available from Clariant. In one example, one or both of Cab-O-Sperse® K-7028 and Disperbyk® 190 can be used.

In one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse the alumina coated white metal oxide pigment can be a polyether alkoxysilane or polyether phosphate dispersant. Upon dissolution in water with the alumina and the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the alumina coated white metal oxide pigment. This coating can increase the hydrodynamic radius of the particles and thus reduce their effective density and settling rate. Furthermore, the dispersant coating and the amphoteric alumina particles prevent agglomeration of the alumina coated white metal oxide pigment upon settling so that when sediment and settling does occur over time in the ink formulations, the settled pigment and other particles remain fluffy and thus are easy to redisperse upon agitation. In still further detail, these dispersants have a relatively short chain length and do not contribute significantly to the ink viscosity, even with relatively high metal oxide particulate loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —Si(OR)$_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few highly practical examples, structures with —Si(OR)$_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the alumina coated white metal oxide pigment and amphoteric alumina particles. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet print heads (which can cause thermal inkjet print heads to fail over time or render them non-operational in some instances).

In further detail, examples polyether alkoxysilane dispersants that may be used to disperse alumina coated white metal oxide pigment can be represented by the following general Formula (I):

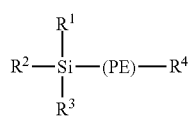

(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —OCH$_3$ and —OCH$_2$CH$_3$. In some examples, $R^1$, $R^2$ and $R^3$ are linear alkoxy groups having from 1 to 5 carbon atoms. In some other examples, $R^1$, $R^2$ and $R^3$ groups are —OCH$_3$ or —OCH$_2$H$_5$.

b) PE is a polyether oligomer chain segment of the structural formula [(CH$_2$)$_n$—CH(R)—O]$_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as CH$_3$ or C$_2$H$_5$. In some examples, m is an integer ranging from 3 to 30 and, in some other examples, m is an integer ranging from 5 to 15. The polyether chain segment (PE) may include repeating units of polyethylene glycol (PEG) chain segment (—CH$_2$CH$_2$—O—), or polypropylene glycol (PPG) chain segment (—CH$_2$—CH(CH$_3$)—O—), or a mixture of both types. In some examples, the polyether chain segment (PE) contains PEG units (—CH$_2$CH$_2$—O—); and c) $R^4$ is hydrogen, or a linear or a branched alkyl group. In some examples, $R^4$ is an alkyl group having from 1 to 5 carbon atoms.

Other examples of dispersants used to disperse alumina coated white metal oxide pigment can include polyether alkoxysilane dispersants having the following general Formula (II):

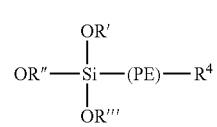

(II)

wherein R', R" and R'" are linear or branched alkyl groups. In some examples, R', R" and R'" are linear alkyl groups having from 1 to 3 carbon atoms in chain length. In some examples, R', R" and R'"—CH$_3$ or —C$_2$H$_5$. $R^4$ and PE are as described above for Formula (I); i.e. PE is a polyether oligomer chain segment of the structural formula: [(CH$_2$)$_n$—CH—R—O]$_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is CH$_3$ or C$_2$H$_5$.

In some examples, the alumina coated white metal oxide pigment present in the ink compositions are dispersed with polyether alkoxysilanes. Examples of suitable polyether alkoxysilanes include (CH$_3$O)$_3$Si—(CH$_2$CH$_2$O)$_n$, H, (CH$_3$CH$_2$O)$_3$Si—(CH$_2$CH$_2$O)$_n$, H; (CH$_3$O)$_3$Si—(CH$_2$CH$_2$O)$_n$, CH$_3$; (CH$_3$CH$_2$O)$_3$Si—(CH$_2$CH$_2$O)$_n$, CH$_3$; (CH$_3$O)$_3$Si—(CH$_2$CH$_2$O)$_n$, CH$_2$CH$_3$; (CH$_3$CH$_2$O)$_3$Si—(CH$_2$CH$_2$O)$_n$, CH$_2$CH$_3$; (CH$_3$O)$_3$Si—(CH$_2$CH(CH$_3$)O)$_n$, H; (CH$_3$CH$_2$O)$_3$Si—(CH$_2$CH(CH$_3$)O)$_n$, H; (CH$_3$O)$_3$Si—(CH$_2$CH(CH$_3$)O)$_n$, CH$_3$; (CH$_3$CH$_2$O)$_3$Si—(CH$_2$CH(CH$_3$)O)$_n$, CH$_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest®A-1230 manufactured by Momentive Performance Materials, and Dynasylan® 4144 manufactured by Evonik/Degussa.

The amount of dispersant used to disperse the alumina coated white metal oxide pigment and other solids may vary from about 0.3% by weight to about 10% by weight of the white metal oxide pigment content. In some examples, the dispersant content range is from about 0.5 to about 4% by weight of the white metal oxide pigment content. In some other examples, the dispersant content range is from about 0.8 to about 3% by weight of the white metal oxide pigment content. In one example, it has been found that too much of an excess in the dispersant concentration may interfere with the boehmite gelling or solids flocculation effect. For example, 0.5 wt % Carbosperse® or 0.8 wt % Disperbyk® 190 based on the pigment weight can be enough to be effective and preserve the gelling effect. When the dispersed pigment is admixed in the white ink, the concentration will be lower, e.g., from 0.05 wt % to 1 wt %, based on the total ink weight.

A dispersion of white metal oxide pigment suitable for forming the white inks of the present disclosure can be prepared via milling or dispersing metal oxide powder in water in the presence of suitable dispersants and alumina. For example, the metal oxide dispersion may be prepared by milling commercially available inorganic oxide pigment with alumina coating (having a large particulate size, e.g., even in the micron range) in the presence of a polymeric dispersant, or by milling of white oxide pigment coated with alumina-rich gel-coat, until the desired particulate size is achieved. The starting dispersion to be milled can be an aqueous dispersion with solid content up to 65% by weight of the white metal oxide pigment. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd, or MiniCer® bead mill (available from NETZSCH Premier Technologies, LLC, Exton, Pa.). The milling duration, rotor speed, and/or temperature may be adjusted to achieve the dispersion particulate size desired. In one example, the polymeric dispersant can include a short-chain anionic dispersant or a non-ionic or predominantly non-ionic dispersant, or both. Thus, the polymeric dispersant can be co-milled with the alumina-coated white metal oxide pigment, thereby modifying both the surface of white metal oxide pigment and physical character of the alumina (creating a coating of alumina on the reduced size white metal oxide pigment). The freshly milled surface and coating can thus be highly accepting of the polymeric dispersant.

It is also notable that there can be some advantages to adding the latex particles to the inks of the present disclosure. For example, by combining the modified white metal oxide pigment (modified by alumina coating and polymeric dispersant) with latex particles, opacity can be increased further. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particles with a relatively lower refractive index (e.g., from 1.3 to 1.6), the opacity of the ink when printed on a media sheet can be unexpectedly increased further compared to an ink without the added latex particles.

The latex particles (at high enough concentration) can form continuous polymer phase after the ink printing and drying/curing. This polymer phase can bind rigid particles into continuous coating with good mechanical durability, i.e. act as a binder phase. In the absence of the binder in these ink formulations, the printed layer would may not have as much mechanical durability (reduced rub resistance, etc.). In one example, a latex dispersion may be produced by emulsion polymerization or co-polymerization of acrylic and styrene monomers. The list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like.

The monomers used in the latexes can also be vinyl monomers. In one example, the monomers can be vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers as mentioned, as well as hydrophobic monomers. Furthermore, monomers that can be polymerized in forming the latexes include, without limitation (some of which being previously mentioned), styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particle sizes range from 50 nm to 300 nm. Glass transition temperatures may range from −20° C. to 130° C. The latex content in the white ink formulations, when present, may range from 2 wt % to 30 wt %, or from 5 wt % to 25 wt %, or more typically from 10 wt % to 20 wt %.

As mentioned, the particulate size of the white metal oxide pigment can be from 200 nm to 700 nm, but in other examples, the particulate size can be from 300 nm to 600 nm, from 400 nm to 550 nm, or 180 nm to 400 nm. These larger sized particles are considered to be efficient particulate sizes for light scattering when spaced appropriately by the alumina coating, amphoteric alumina particles, and the latex particles. The more efficient the light scattering, typically, the more opaque the printed ink layer may be (assuming appropriate spacing in the pigmented layer as described herein). Thus, the white inks of the present disclosure can be formulated such that when printed, the alumina coating, amphoteric alumina particles, and latex particles provide an average space between white metal oxide pigments ranging from 20 nm to 1,000 nm, in one example. In other examples, the average space between white metal oxide pigments can be 50 nm to 500 nm, from 50 to 300, or in one specific example, about 50 nm to 250 nm.

In further detail, optical spacing can be experimentally evaluated by printing the ink on a media substrate, and when a latex is present, fusing the ink by applying heat at a temperature about 2° C. to 110° C. above the minimum film formation temperature of the latex particles, and evaluating using Transition Electron Microscopy (TEM) cross-section photo of a printed white ink layer after drying. If the opacity provided by the white ink is not high enough, the ratio of white metal oxide pigment to latex particles can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment and latex particles, opacity can be boosted from 0.1% to 25%, and more typically, from 5% to 25%.

In addition to assisting with enhanced opacity, as briefly mentioned, the latex particles can also provide enhanced durability. More specifically, the use of latex particles, including fusible latex particles that are thermally or otherwise cured after printing on the media substrate, can provide added durability to the printed image. Thus, the latex can provide the dual role of assisting the alumina coating in enhancing opacity by appropriately spacing the white metal oxide pigment, and can also provide durability on the printed media sheet. This is particularly the case in examples where there may be high metal oxide particulate loads that are dispersed by appropriate dispersing agents. Films formed by hard ceramic particles such as high refractive index metal oxides on surface of low porosity and non-porous media substrates tend to have very poor mechanical properties. The film-forming behavior of latex particles described herein can bind the relatively large white metal oxide pigment (with dispersing agent present in the ink) into continuous coating that can be very durable. Additionally, as mentioned, the low refractive index of the polymer film along with the alumina coating creates low refractive index or "n" domains, i.e. optical spacers between high n white metal oxide pigment particles, thereby enhancing opacity of the print.

Coalescence of latex particles into a continuous phase creates low refractive index domains in the coating. The refractive index of the fused latex in the coating may range from 1.3 to 1.65, and in one example, can be from 1.4 to 1.6, or 1.4 to 1.5. That, in conjunction with the alumina (or alumina and silica) coating with a refractive index ranging from 1.4 to 1.65 is contrasted with the white metal oxide pigment particles which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The latexes can have various shapes, sizes, and molecular weights. In one example, polymer in the latex particles may have a weight average molecular weight (Mw) of about 5,000 Mw to about 500,000 Mw. In one aspect, the latex particles can have a weight average molecular weight (Mw) ranging from about 100,000 Mw to about 500,000 Mw. In some other examples, the latex resin has a weight average molecular weight of about 150,000 Mw to 300,000 Mw.

The white inks described herein are very useful for inkjet application, including thermal inkjet application. In one example, a reactive hydrophilic alkoxysilane dispersant can be used to assist in particulate dispersion and jettability. These or other dispersants can be short-chain anionic, or non-ionic or predominantly non-ionic in nature. In some specific examples, inkjet printing of white coatings or patterns with adequate opacity (>50-60%) can benefit from a relatively high pigment load (e.g. white metal oxide pigment above 2 wt %, above 5 wt %, above 8 wt %, etc.). Jetting of high pigment load (particularly with other solids) inks becomes challenging even for piezo print heads. However, with the use of an appropriate dispersant, such as the non-ionic or predominantly non-ionic dispersants described herein, more reliable performance of higher metal oxide particulate loads printed from thermal inkjet print heads with low nominal drop weight (as low as 10 ng, or even as low as 5 ng) can be realized.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight (Mw) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 Mw, and in one aspect, less than 50,000 Mw. In another example, cationic polymers can have high charge densities to enhance fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or multiple polycations may be used, and that any desirable combination of the polycations can be used. One or multiple ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical ink vehicle or fixer vehicle formulations described herein can include water and other ingredients, depending on the application method desired for use. For example, when jetting the ink or fixer, the formulation may include water as well as co-solvents present in total at from 0.1 wt % to 50 wt %, though amounts outside of this range can also be used. Further, surfactants can be present, ranging from 0.01 wt % to 10 wt %. The balance of the formulation can further include or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Apart from water, the ink vehicle can include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the print head jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, and/or other additives to modify properties of the ink as desired. Such additives can be present at from 0.01 wt % to 20 wt %.

Figure 6:
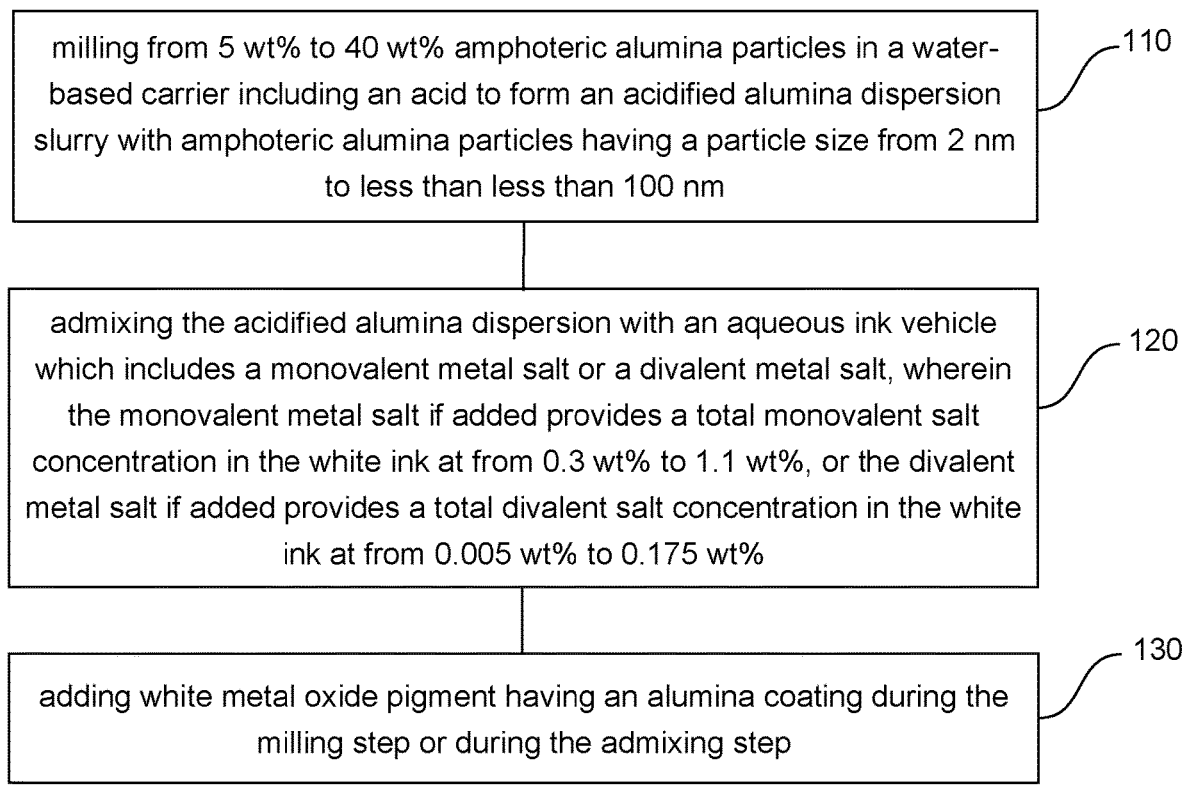
FIG. 6 is a flow chart describing an example method of making a white ink in accordance with the present disclosure.

The white inks of the present disclosure can be prepared by various methods. However, in one example, a method of making white inks is shown and described in FIG. 6, which provides a flow chart depicting such a method. This method can include milling 110 from 5 wt % to 40 wt % amphoteric alumina particles in a water-based carrier including an acid to form an acidified alumina dispersion slurry with amphoteric alumina particles having a particle size from 2 nm to less than 100 nm. An additional step can include admixing 120 the acidified alumina dispersion with an aqueous ink vehicle which includes a monovalent metal salt or a divalent metal salt. The monovalent metal salt can be added to provide a total monovalent salt concentration in the white ink at from 0.3 wt % to 1.1 wt %, or a total divalent metal salt concentration in the white ink at from 0.005 wt % to 0.175 wt %. The method can also include adding 130 white metal oxide pigment with an alumina coating during the milling step or during the admixing step to thereby form the white ink.

The alumina coating can be primarily alumina or aluminosilicate, for example. In one specific example, the average particulate of the white metal oxide pigment can be from 200 nm to 700 nm. The acid can be nitric acid, sulfuric acid, or hydrochloric acid, and/or the acidified alumina dispersion slurry has a pH from 3 to 5, e.g., about pH 4. The method can further include destabilizing the white metal oxide pigment and the amphoteric alumina particles in the white ink to form a flocculated mass. In one example, the method can further include resuspending the white metal oxide pigment and the amphoteric alumina particles in the white ink to form an inkjettable white ink. An additional step can include adding latex particles to the aqueous ink vehicle either prior to, at the same time, or after admixing with the acidified alumina dispersion. Thus, in one example, the method can be carried out to prepare a white ink including from 5 wt % to 25 wt % of the white metal oxide pigment, from 0.05 wt % to 1 wt % of polymeric dispersant, from 0.05 wt % to 0.5 wt % of the amphoteric alumina particles, and from 2 wt % to 30 wt % latex particles.

It is to be understood that this disclosure is not limited to the particular processes and materials disclosed herein because such processes and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to an ink, but may in fact be essentially colorless pigments with a high refractive index, e.g., greater than 1.6 or greater than 1.8. For Example, titanium dioxide ($TiO_2$) is an example of such a pigment that imparts white color to an ink, but when viewed on a particle by particle basis, can appear colorless.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other known, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, methods, and fluid sets that are presently known. However, it is to be understood that the following are only illustrative of the application of the principles of the present disclosure. Numerous modifications and alternative examples may be devised without departing from the spirit and scope of the present compositions and methods. Thus, while the present inks, methods, and fluid sets have been described above with particularity, the following examples provide further detail in connection with what are presently deemed to be some of the acceptable examples.

Example 1—Preparation of 5 White Inks

Five white inks were formulated by preparing an amphoteric alumina particle dispersion using 10 wt % boehmite in water and adjusting the pH to about 4 using a strong acid. The composition was then mixed with a propeller mixer until uniform, and then milled using a bead mill. An ink vehicle with added salt, latex, pigment, and other ingredients was then admixed therewith. The inks prepared are provided in accordance with Table 1, as follows:

TABLE 1

| Ink Formulations (Inks 1-5) | | | | | |
|---|---|---|---|---|---|
| Ingredient | Ink 1 | Ink 2 | Ink 3 | Ink 4 | Ink 5 |
| Boehmite Amphoteric Alumina Particles (50 nm) (Dispal ® 23N4-80 from Salsol) | 0 wt % | 0 wt % | 0.155 wt % | 0.31 wt % | 0.31 wt % |
| *Potassium Sulfate | | | | | |
| Salt Weight % | 0 wt % | 0.178 wt % | 0.089 wt % | 0 wt % | 0.178 wt % |
| Salt mM Conc. | 0 mM | 10.24 mM | 5.12 mM | 0 mM | 10.24 mM |
| Ionic strength | 0 mM | 30.72 mM | 15.36 mM | 0 mM | 30.72 mM |
| 1,2-butanediol | 11.97 wt % | 11.97 wt % | 11.97 wt % | 11.97 wt % | 11.97 wt % |
| 2-pyrrolidone | 4.1 wt % | 4.1 wt % | 4.1 wt % | 4.1 wt % | 4.1 wt % |
| [1]Dowanol TPM | 1.79 wt % | 1.79 wt % | 1.79 wt % | 1.79 wt % | 1.79 wt % |
| [1]Dowanol TPnB | 0.63 wt % | 0.63 wt % | 0.63 wt % | 0.63 wt % | 0.63 wt % |
| [2]Acticide B20 | 0.14 wt % | 0.14 wt % | 0.14 wt % | 0.14 wt % | 0.14 wt % |
| [2]Acticide M20 | 0.05 wt % | 0.05 wt % | 0.05 wt % | 0.05 wt % | 0.05 wt % |
| [1]Tergitol 15-S-7 | 0.36 wt % | 0.36 wt % | 0.36 wt % | 0.36 wt % | 0.36 wt % |
| [4]Capstone FS-35 | 0.26 wt % | 0.26 wt % | 0.26 wt % | 0.26 wt % | 0.26 wt % |
| Alumina Coated White Pigment | 12.2 wt % | 12.2 wt % | 12.2 wt % | 12.2 wt % | 12.2 wt % |
| Butylmethacrylate Methylmethacrylate latex | 10.28 wt % | 10.28 wt % | 10.28 wt % | 10.28 wt % | 10.28 wt % |
| Water | Balance | Balance | Balance | Balance | Balance |

[1]Dow Chemical Company;
[2]Thor;
[3]Chemours; and
[4]Saso Germany.\

*Concentrations (wt % and mM), and Ionic Strength (mM) are based on "added" salt. Notably, these formulations otherwise already include an ionic strength of monovalent salt at 15 mM prior to the potassium sulfate addition (due to minor amounts of salt present in some of the other ingredients). Thus, about 15 mM of ionic strength and related concentrations (wt % and mM) should be added to the salt values to arrive at the true concentrations and ionic strengths. Thus, Ink 1 actually includes an inherent ionic strength of monovalent salt of about 15 mM, Ink 2 is about 46 mM, Ink 3 is about 30 mM, etc. Assuming potassium sulfate, the weight percentage should be increased in these examples by about 0.26 wt %, e.g., Ink 1 is about 0.26 wt %, Ink 2 is about 0.44 wt %, Ink 3 is about 0.35, etc.

Example 2—27 White Ink Samples Prepared Using Inks 1-5 and Blends of Inks 1-5

The five inks prepared in accordance with Table 1 were admixed together in various proportions to generate 22 additional unique ink blends in addition to the five inks prepared in accordance with Example 1. Table 2 below shows the various rounded concentrations of boehmite and potassium present in Inks 1-5 as well as the 22 blended inks prepared from inks 1-5, as follows:

TABLE 2

Ink Blend Formulations

| Ink ID | Boehmite wt % (rounded) | $K_2SO_4$ Salt Concentration* Wt % (rounded) | $K_2SO_4$ Salt Concentration* mM (rounded) | $K_2SO_4$ Ionic Strength* mM (rounded) |
|---|---|---|---|---|
| Ink 1 | 0 | 0 | 0 | 0 |
| Ink 2 | 0 | 0.175 | 10.2 | 30.6 |
| Ink 3 | 0.16 | 0.09 | 5.1 | 15.3 |
| Ink 4 | 0.31 | 0 | 0 | 0 |
| Ink 5 | 0.31 | 0.175 | 10.2 | 30.6 |
| Ink Blend A | 0.23 | 0.045 | 2.6 | 7.8 |
| Ink Blend B | 0.15 | 0.09 | 5.1 | 15.3 |
| Ink Blend C | 0.08 | 0.135 | 7.7 | 23.1 |
| Ink Blend D | 0.08 | 0.045 | 2.6 | 7.8 |
| Ink Blend E | 0.23 | 0.135 | 7.7 | 23.1 |
| Ink Blend F | 0 | 0.09 | 5.1 | 15.3 |
| Ink Blend G | 0.31 | 0.09 | 5.1 | 15.3 |
| Ink Blend H | 0.15 | 0.175 | 10.2 | 30.6 |
| Ink Blend I | 0.15 | 0 | 0 | 0 |
| Ink Blend J | 0.31 | 0.045 | 2.6 | 7.8 |
| Ink Blend K | 0.31 | 0.135 | 7.7 | 23.1 |
| Ink Blend L | 0 | 0.045 | 2.6 | 7.8 |
| Ink Blend M | 0 | 0.135 | 7.7 | 23.1 |
| Ink Blend N | 0.08 | 0.175 | 10.2 | 30.6 |
| Ink Blend O | 0.23 | 0.175 | 10.2 | 30.6 |
| Ink Blend P | 0.08 | 0 | 0 | 0 |
| Ink Blend Q | 0.23 | 0 | 0 | 0 |
| Ink Blend R | 0.08 | 0.09 | 5.1 | 15.3 |
| Ink Blend S | 0.23 | 0.09 | 5.1 | 15.3 |
| Ink Blend T | 0.15 | 0.135 | 7.7 | 23.1 |
| Ink Blend U | 0.16 | 0.045 | 2.6 | 7.8 |
| Ink Blend V | 0.19 | 0.09 | 5.1 | 15.3 |

*As with Table 1, values relate to "added" salt. The inks used for the blends start with an ionic strength of 15 mM and, assuming potassium sulfate, a weight percent of about 0.26 wt % salt. These values can be added to the values in Table 2 to arrive at the ionic strength and approximate weight percentage of salt.

Example 3—Evaluation of Viscosity, Conductivity, and Settling of Inks 1-5 and Ink Blends A-V The ink samples were each placed in 50 mL cone-shaped tubes (cones on the bottom) and each ink was tested for Viscosity, Conductivity, and 7 day settling.

Figure 7:
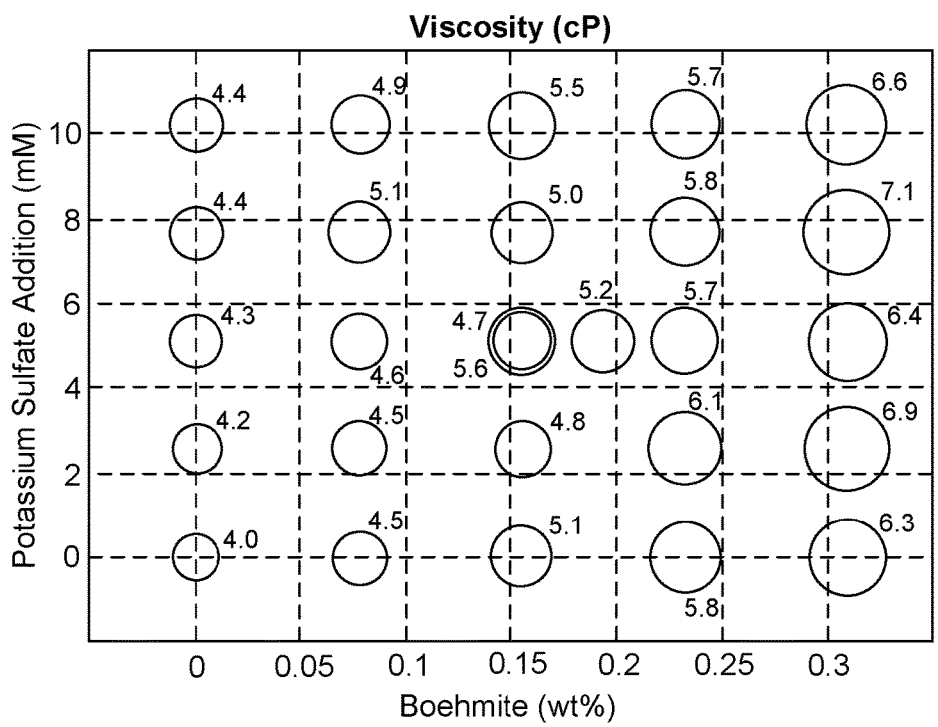
FIG. 7 graphically depicts the viscosity of multiple white inks, many of which include both amphoteric alumina particles and monovalent or divalent salt prepared in accordance with the present disclosure.

FIG. 7 shows the viscosity for each of the tested inks each sample was tested. As can be seen from this FIG., as the boehmite concentration increases, the viscosity increases slightly. Likewise, as the salt concentration increases, the viscosity only increases slightly. Thus, the viscosity is relatively stable with the addition of the boehmite and salt.

Figure 8:
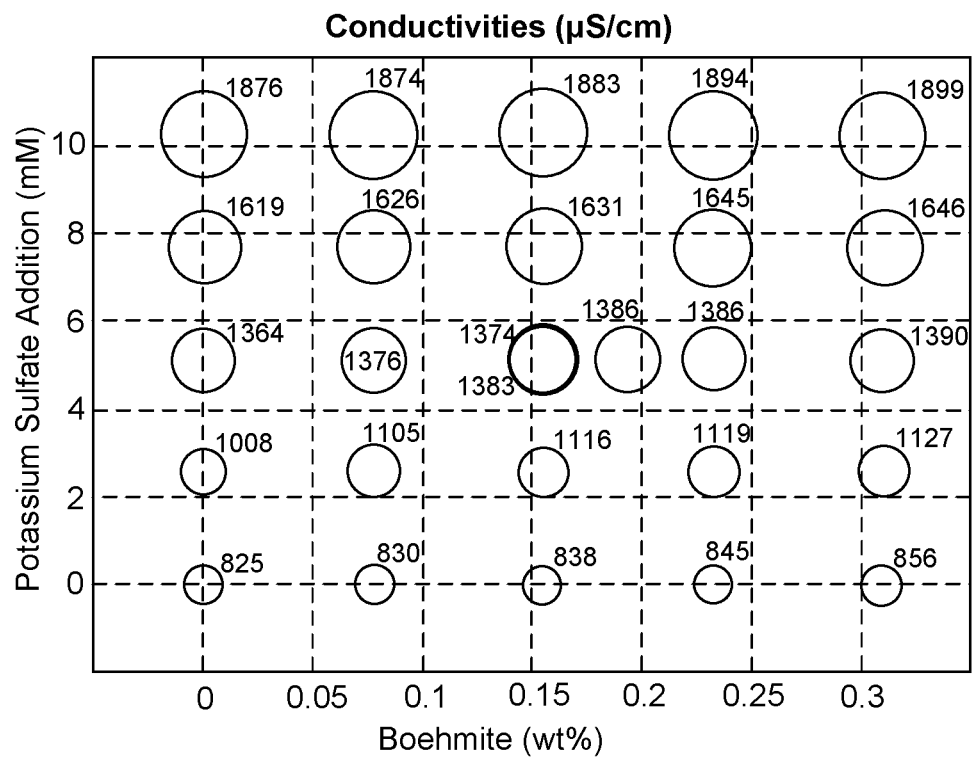
FIG. 8 is graphically depicts the conductivity of multiple white inks, many of which include both amphoteric alumina particles and monovalent or divalent salt prepared in accordance with the present disclosure.

FIG. 8 shows the conductivity values for each of the inks tested. The increase in concentration of the salt increased the conductivity, but the increase in boehmite concentration only very slightly increased the conductivity. It is noted that the pre-acidified Dispal® 23N4-80 powder only provides a small contribution to the ionic strength of the ink. In these instances with little to no added salt, most of the ionic strength comes from potassium hydroxide used in pH adjustment of the pigment dispersion, latex dispersion, ink, and the potassium sulfate as a break down product of the potassium persulfate latex initiator. The added potassium sulfate salt is shown to thus provide much of the conductivity.

Figure 9:
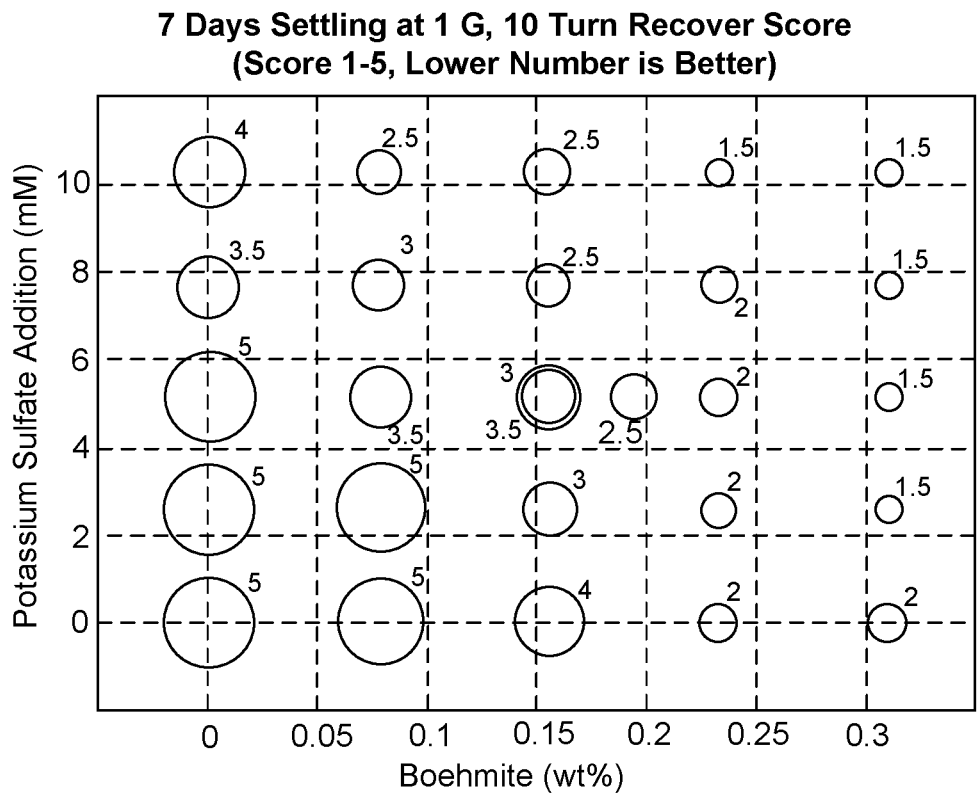
FIG. 9 graphically depicts settling data for multiple white inks, many of which include both amphoteric alumina particles and monovalent or divalent salt prepared in accordance with the present disclosure.

FIG. 9 shows the data collected from sediment formed in 50 mL test tubes (with the cone-shaped bottoms) produced at 7 days. After 7 days, the test tubes were turned over 10 times to resuspend the settled solids, e.g., pigment. X-ray photos were taken and each photo was scored from 1 (best—no settling remaining in the bottom cone shaped tip) to 5 (worst—significant settling remaining in the bottom cone shaped tip). A score of 3.5 or lower indicates a relatively significant improvement over a score of 5. A score of 1 is difficult to achieve, but a score of 1.5 indicates that nearly all of the sediment was resuspended. The X-ray photos and resuspension or recovery score revealed that as the amphoteric boehmite alumina particles alone improved recovery significantly, with looser flocculated masses forming with greater boehmite concentrations. That being said, the addition of small concentrations of monovalent salt improved the settling and resuspension properties still further. For example, solids in Ink 1 (no boehmite and no salt) settled after 7 days at the bottom of the test tube with a dark mass (in the X-ray) of densely packed pigment that was not easily resuspendable. As the boehmite content was increased, less and less of the densely packed pigment was present and resuspension was more readily possible. As the monovalent salt concentration was also increased, the trend of looser flocculent and easier resuspension of the solids continued.

Example 4—Settling Comparison of Inks with Divalent Metal Salt vs. Monovalent Metal Salt 16 inks were prepared based on Inks 1-5 in Example 1, except in this instance, the boehmite concentration was held constant at 0.155 wt % and the metal salt was varied both in type (monovalent or divalent) and in concentration. The two metal salts tested were potassium sulfate (monovalent metal salt) and calcium nitrate (divalent metal salt). At different levels of metal salt and using two different classes of salts, 4 day settling properties (before resuspension) as well as 4 day resuspension could be directly compared. Cone-shaped tubes (cones on the bottom) were used in place of the larger tubes in Example 3. The various ink samples, 0.8 ml each, were each placed in 1.5 mL microcentrifuge tubes. The tubes were left to sit under normal gravity. After 4 days, X-ray photos were taken and each photo scored and evaluated for comparison purposes on how dense the sediment was at the bottom of the tube (prior to any efforts to resuspend the solids). A denser sediment meant the pigment was more compacted. The test tubes were then turned over 10 times to resuspend the settled solids, e.g., pigment and alumina. X-ray photos were taken again after this resuspension step and each photo scored and evaluated for comparison purposes. The various metal salt identities and concentrations/ionic strength are shown in Table 3, as follows:

TABLE 3

| Ink ID | Metal Salt ID | Salt Concentration (wt %) | Salt Concentration (mM) | Ionic Strength (mM) | 4 Day Settling Compaction Score (1-5, where 1 is best) | 4 Day Sediment Recovery Score (1-5, where 1 is best) |
|---|---|---|---|---|---|---|
| Ink AA | None | 0 | 0 | 0 | 5 | 5 |
| Ink BB | $K_2SO_4$ | 0.07 | 4 | 12 | 3 | 3 |
| Ink CC | $K_2SO_4$ | 0.139 | 8 | 24 | 2 | 2 |
| Ink DD | $K_2SO_4$ | 0.209 | 12 | 36 | 1 | 2 |

TABLE 3-continued

| Ink ID | Metal Salt ID | Salt Concentration (wt %) | Salt Concentration (mM) | Ionic Strength (mM) | 4 Day Settling Compaction Score (1-5, where 1 is best) | 4 Day Sediment Recovery Score (1-5, where 1 is best) |
|---|---|---|---|---|---|---|
| Ink EE | $K_2SO_4$ | 0.278 | 16 | 48 | 1 | 2 |
| Ink FF | $K_2SO_4$ | 0.348 | 20 | 60 | 1 | 2 |
| Ink GG | $Ca(NO_3)_2$ | *0.01 | 0.64 | 1.93 | 4 | 4 |
| Ink HH | $Ca(NO_3)_2$ | *0.021 | 1.29 | 3.86 | 3 | 3 |
| Ink II | $Ca(NO_3)_2$ | *0.032 | 1.93 | 5.78 | 1 | 2 |
| Ink JJ | $Ca(NO_3)_2$ | *0.042 | 2.57 | 7.71 | 1 | 1 |
| Ink KK | $Ca(NO_3)_2$ | *0.053 | 3.21 | 9.64 | 1 | 1 |
| Ink LL | $Ca(NO_3)_2$ | *0.004 | 0.23 | 0.69 | 5 | 5 |
| Ink MM | $Ca(NO_3)_2$ | *0.008 | 0.46 | 1.38 | 4 | 4 |
| Ink NN | $Ca(NO_3)_2$ | *0.011 | 0.69 | 2.07 | 4 | 4 |
| Ink OO | $Ca(NO_3)_2$ | *0.015 | 0.92 | 2.76 | 3 | 4 |
| Ink PP | $Ca(NO_3)_2$ | *0.019 | 1.15 | 3.45 | 3 | 3 |

*The weight percentage for $Ca(NO_3)_2$ salt was calculated as the non-hydrated salt. Notably, hydrated salts can be used but the weight percentage is not calculated for clarity.

Based on Table 3 above, the X-ray photos after four (4) days of settling, and after resuspension or recovery revealed that amphoteric boehmite alumina particles alone (Ink AA) improved recovery to some extent, with looser flocculated masses forming with greater boehmite concentrations. However, the addition of small concentrations of monovalent metal salt (Inks BB to FF) improved the settling and resuspension properties still further. For example, solids in Ink 1 (no boehmite and no salt) settled after 4 days at the bottom of the test tube with a mass (white colored, but dark mass in the X-ray) of densely packed pigment and other solids that were not easily resuspended. As the boehmite content was added and increased, less and less of the densely packed pigment remained after the 10 turn resuspension protocol. Furthermore, as the monovalent salt concentration was also increased, the trend of looser flocculent and easier resuspension of the solids was enhanced. This was also true of the divalent metal salt. In those inks (Inks GG to PP), sediments were observed as well as a settled mass (white colored, but dark mass in the X-ray). Comparing the sediments generally (monovalent vs. divalent), the calcium nitrate (in terms of ionic strength) has an effect about 5 times that from the potassium nitrate. In other words, a lower ionic strength value for the calcium performed favorably compared to a higher ionic strength value for the potassium. Thus, as an example, an ionic strength 25 mM for $K_2SO_4$ can provide relatively similar flocculation and resuspension properties as about 5 mM of $Ca(NO_3)_2$.

While the disclosure has been described with reference to certain examples, various modifications, changes, omissions, and substitutions can be made without departing from the spirit of the disclosure. It is intended, therefore, that the present disclosure be limited only by the scope of the following claims.

What is claimed is:

1. A white ink, comprising:
 an aqueous ink vehicle;
 from 5 wt % to 25 wt % of white metal oxide pigment having an alumina coating;
 a dispersant associated with a surface of the white metal oxide pigment;
 from 0.05 wt % to 0.5 wt % of amphoteric alumina particles having an average particles size from 2 nm to less than less than 100 nm; and
 from 0.3 wt % to 1.1 wt % monovalent metal salt, or from 0.005 wt % to 0.175 wt % divalent metal salt, or both.

2. The white ink of claim 1, wherein the monovalent metal salt is present and comprises $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, or a combination thereof.

3. The white ink of claim 1, wherein the divalent metal salt is present and comprises $Ca(NO_3)_2$, $Mg(NO_3)_2$, $CaCl_2$, $MgCl_2$, or a combination thereof.

4. The white ink of claim 1, wherein the white metal oxide pigment has an average particle size from 200 nm to 700 nm, and includes titanium dioxide particles, zinc oxide particles, zirconium oxide particles, or combinations thereof, and wherein the alumina coating is of alumina or an admixture of alumina and silica.

5. The white ink of claim 1, wherein the white ink further comprises latex particles having a glass transition temperature from −20° C. to 130° C.

6. The white ink of claim 1, wherein the dispersant includes a non-ionic or predominantly non-ionic polymeric dispersant defined by an acid number not higher than 100 mg KOH/g based on dry polymer weight, and wherein the polymeric dispersant further comprises an anionic anchoring group attached to the white metal oxide pigment or an alumina-containing coating of the white metal oxide pigment; or the dispersant includes an anionic dispersant defined by having an acid number higher than 100 mg KOH/g based on dry polymer weight attached to the alumina coating.

7. The white ink of claim 1, wherein the white metal oxide pigment and the amphoteric alumina particles are suspended in the white ink when the white ink is in an agitated state, and wherein the white metal oxide pigment and the amphoteric alumina particles are in the form of a flocculated mass upon settling of solids in the white ink.

8. The white ink of claim 1, wherein monovalent salt provides an ionic strength in the white ink from 20 mM to 135 mM, or divalent salt provides an ionic strength in the white ink at from 1 mM to 30 mM.

9. A method of preparing a white ink, comprising:
 milling from 5 wt % to 40 wt % amphoteric alumina particles in a water-based carrier including an acid to form an acidified alumina dispersion slurry with amphoteric alumina particles having a particle size from 2 nm to less than less than 100 nm;
 admixing the acidified alumina dispersion with an aqueous ink vehicle which includes a monovalent metal salt or a divalent metal salt, wherein the monovalent metal salt if added provides a total monovalent salt concentration in the white ink at from 0.3 wt % to 1.1 wt %, or the divalent metal salt if added provides a total divalent salt concentration in the white ink at from 0.005 wt % to 0.175 wt %; and adding white metal oxide pigment having an alumina coating during the milling step or during the admixing step, thereby form the white ink.

10. The method of claim 9, wherein the acid comprises nitric acid, sulfuric acid, or hydrochloric acid, and wherein the acidified alumina dispersion slurry has a pH from 3 to 5.

11. The method of claim 9, further comprising destabilizing the white metal oxide pigment and the amphoteric alumina particles in the white ink to form a flocculated mass, followed by resuspending the white metal oxide pigment and the amphoteric alumina particles in the white ink to form an inkjettable white ink.

12. The method of claim 9, wherein the monovalent salt provides an ionic strength in the white ink from 20 mM to 135 mM, or the divalent salt provides an ionic strength in the white ink from 1 mM to 30 mM.

13. The method of claim 9, wherein the white ink prepared comprises:

from 5 wt % to 25 wt % of the white metal oxide pigment with the alumina coating and an average particulate size from 200 nm to 700 nm, from 0.05 wt % to 1 wt % of polymeric dispersant, from 0.05 wt % to 0.5 wt % of the amphoteric alumina particles having an average particles size from 2 nm to less than less than 100 nm, and from 2 wt % to 30 wt % latex particles.

14. A fluid set, comprising:

a white ink, including:

an aqueous ink vehicle;

from 5 wt % to 25 wt % of white metal oxide pigment having an alumina coating;

a dispersant associated with a surface of the white metal oxide pigment;

from 0.05 wt % to 0.5 wt % of amphoteric alumina particles dispersed in the aqueous ink vehicle, wherein the amphoteric alumina particles have an average particles size from 2 nm to less than less than 100 nm; and from 0.3 wt % to 1.1 wt % monovalent metal salt, or from 0.005 wt % to 0.175 wt % divalent metal salt, or both; and a fixer fluid, comprising:

aqueous fixer vehicle, and from 0.1 wt % to 25 wt % cationic polymer.

15. The fluid set of claim 13, wherein the white ink is formulated for inkjet application upon agitation to resuspend white metal oxide pigment and the amphoteric alumina particles, and wherein the fixer fluid is formulated for inkjet application having a viscosity from 1 cP to 35 cP at 25° C. or for analog application having a viscosity from 1 cP to 500 cP at 25° C.

* * * * *